INVENTOR
CASIMER J. DABROWSKI

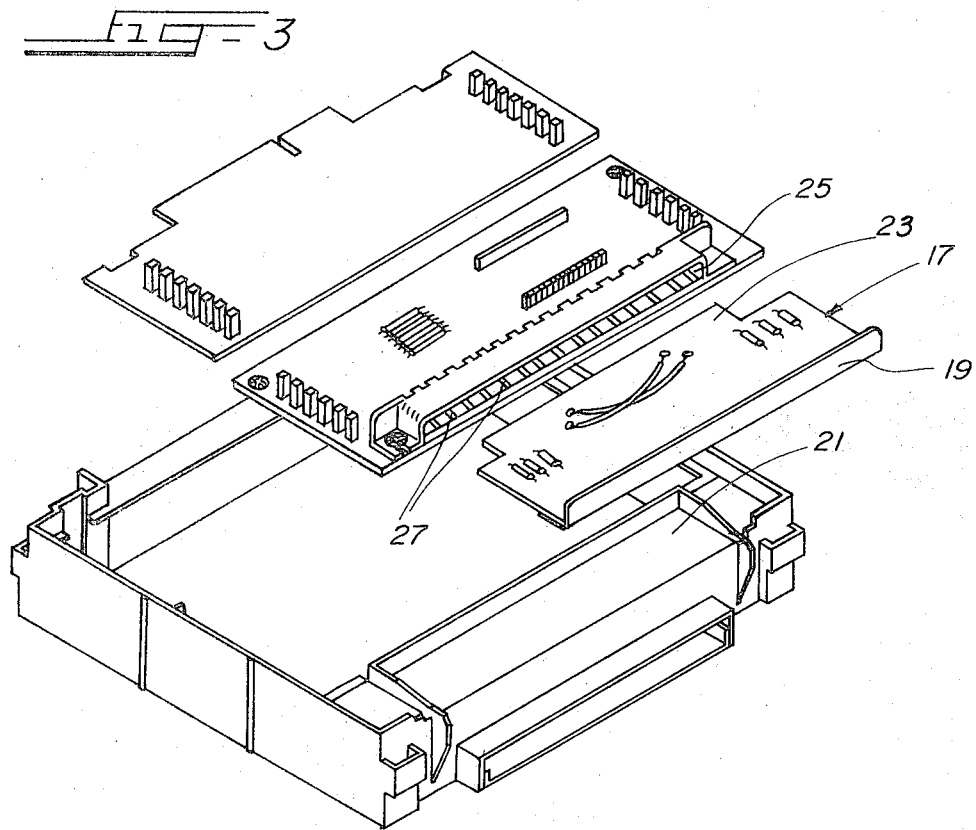
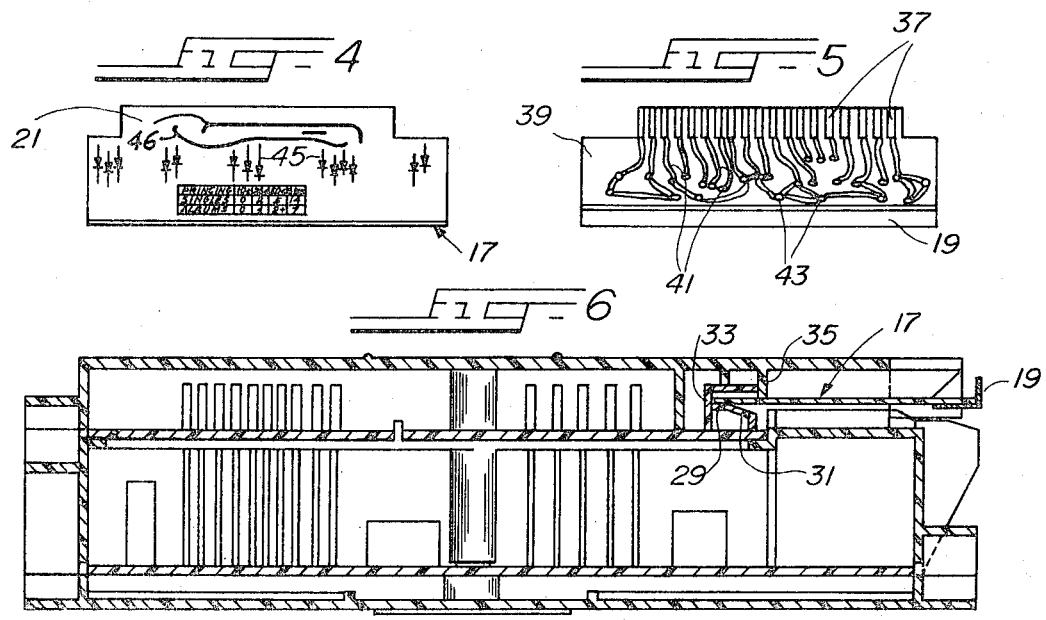

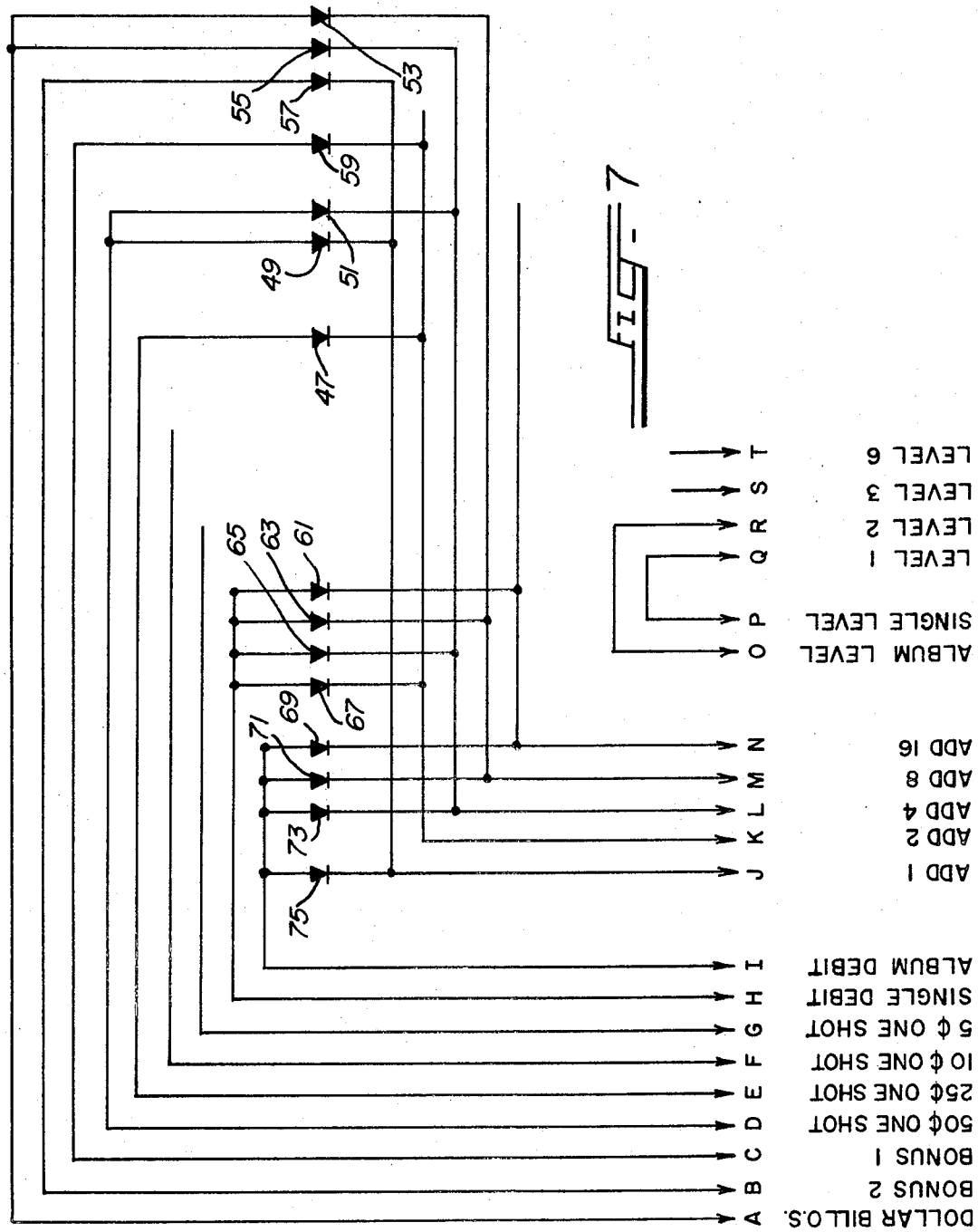

United States Patent Office 3,716,124
Patented Feb. 13, 1973

3,716,124
VENDING MACHINE PRICING CONTROL
ARRANGEMENT
Casimer J. Dabrowski, Mount Prospect, Ill., assignor to
The Seeburg Corporation of Delaware, Chicago, Ill.
Filed Sept. 11, 1970, Ser. No. 71,584
Int. Cl. G01f 9/08
U.S. Cl. 194—1 N
8 Claims

ABSTRACT OF THE DISCLOSURE

A series of pricing boards have circuit connections formed thereon to provide a variety of different pricing combinations based upon the monetary system of the country in which they are to be used and the prices of various vend items. A pricing board having the desired pricing combination is inserted into an appropriate opening in a vending machine, where it is secured to complete appropriate circuits to the pricing apparatus and the vend control mechanism of the vending machine. Controls that may be provided by a pricing board are the amount of credit to be accorded to a monetary unit, the number of credits required to obtain vending of a selected item, and the amount to be debited upon vending of a selected vend item.

BACKGROUND OF THE INVENTION

Field of the invention

This invention relates generally to a pricing control arrangement for vending machines, and more specifically, this invention relates to a coin-operated phonograph pricing control arrangement in which various pricing combinations may be obtained by exchanging one pricing board for another.

Description of the prior art

In vending machines, it is desirable to be able to change the crediting, pricing, and debiting associated with the vending of a vend item. Under different monetary systems it is frequently necessary to change the number of credits allocated to monetary units, such as coins and bills. It is also desirable to be able to change the price of a vend item in order to keep pace with changing conditions in the market place.

In some prior art vending arrangements, changes in the pricing characteristics have required rewiring of the applicable portions of the system. In other prior art vending arrangements, attempts have been made to utilize switching arrangements to control the pricing characteristics. These arrangements have not been generally utilized since the relatively infrequent changes in the pricing characteristics do not justify the relatively high expense of the relatively complex switching required. In addition, the provision of such switches means that unauthorized personnel can relatively easily reset the pricing characteristics, contrary to the wishes and against the best interests of the operator.

SUMMARY OF THE INVENTION

To overcome the above and other disadvantages of prior art devices, the present invention was developed. Briefly, this invention involves the utilization of a plurality of pricing boards, each pricing board having a number of terminals thereon. The terminals on each of the pricing boards are interconnected in various different combinations to provide different pricing characteristics when utilized in the system.

The terminals on the pricing boards correspond to terminals located at a given position and connected to various points in the logic system. Positioning means formed from appropriate portions surrounding the given position releasably detain the pricing boards with the terminals thereon engaging the corresponding terminals at the given position.

A first set of terminals at the given position receives signals from a credit accumulator indicating that a predetermined level of credit has been established. A second set of terminals is connected to appropriate points in the vending machine mechanism to condition the vending machine for vending of a corresponding item when a signal appears thereon. These latter terminals represent the pricing levels and, for example, in a coin-operated phonograph they would be connected to permit the vending of a single selection or an album selection if appropriate credits are established by the customer. Appropriate interconnections are made on each pricing board between terminals corresponding to terminals in the first set of terminals and terminals corresponding to terminals in the second set of terminals in order to control the credit that must be established to enable the vending of a particular vend item a particular pricing board is releasably detained by the positioning means A third set of terminals at the given position receive signals representing the monetary value credited to a customer, such as by the deposit of coins or bills or the use of a credit card. A fourth set of terminals has each terminal connected to a specified input of a credit accumulating device. Thus, appropriate interconnections on the pricing board between the terminals corresponding to the third set of terminals and the fourth set of terminals determine the amount of credit to be established for each monetary unit inserted by a customer.

A fifth set of terminals is provided with signals representative of an amount to be debited by a vend operation. Terminals on the pricing board corresponding to this set of terminals can then be appropriately connected to cause a predetermined reduction in the accumulated credit. In this particular example, since subtraction is achieved by complementary addition, the terminals in the fifth set of terminals are interconnected with terminals in the fourth set of terminals to control the number of credits to be added to achieve the complementary addition function.

Since the amount of credit to be accorded to monetary units is one-element of pricing control, and since the credit level necessary to achieve vending of a specified vend item is another element of pricing control, this arrangement provides great latitude in adjusting the pricing for various monetary systems and for different pricing level requirements. Further, since the amount to be debited for a given vend is a function of pricing, this aspect is also covered by the arrangement disclosed herein. Thus, by using a number of different pricing boards having different combinations of interconnections, the pricing requirements of a vending machine may be quickly and easily altered. Further, since the alternate pricing boards may be locked away, the opportunities for unauthorized personnel to alter the pricing characteristics are greatly reduced. In addition, each vending machine may be manufactured in precisely the same way without regard to the country or market in which it is to be utilized, since appropriate pricing boards can be utilized to adjust the pricing requirements at a relatively low cost, thereby reducing the necessity of separate manufacturing drawings and separate manufacturing procedures and maximizing interchangeability of units.

Accordingly, it is a primary object of this invention to provide an arrangement for quickly and easily altering the pricing characteristics of a vending machine.

Another object of this invention is to provide an arrangement for quickly and easily altering the pricing requirements of a vending machine while limiting the opportunities for unauthorized personnel to make undesired pricing changes.

Yet another object of this invention is to provide an arrangement permitting use of the same basic pricing structure in all vending machines without regard to the markets in which they are to be utilized.

A further object of this invention is to provide an arrangement for adjusting the pricing of a vending machine by means of non-complex interchangeable "plug-in" pricing control boards.

These and other objects, advantages, and features of this invention will hereinafter appear, and for purposes of illustration, but not of limitation, an exemplary embodiment of the subject invention is shown in the appended drawing.

BRIEF DESCRIPTION OF THE DRAWING

FIG. 3 is an exploded perspective view of the enclosure arrangement illustrated in FIG. 2.

FIG. 4 is a top plan view of one example of a pricing board utilized in the subject invention.

FIG. 5 is a bottom plan view of the pricing board illustrated in FIG. 4.

FIG. 6 is a cross-sectional view taken along line 6—6 in FIG. 2.

FIG. 7 is a circuit diagram illustrating a representative set of interconnections on the pricing board.

DETAILED DESCRIPTION OF THE PREFERRED EMBODIMENT

The present invention is adapted to be utilized in any type of vending machine, but this description will be based upon the use thereof in a coin-operated phonograph, the preferred embodiment disclosed herein.

Figure 1:
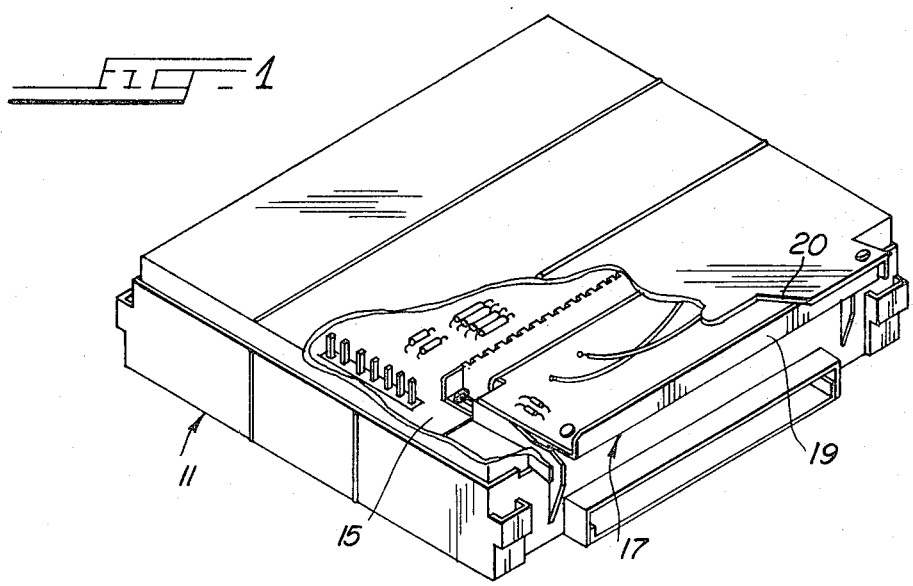
FIG. 1 is a partially broken away perspective view of and electrical circuit enclosure incorporating this invention.

Turning now to FIG. 1, it may be seen that an electrical circuit containing enclosure 11 is illustrated. The enclosure 11 has one layer in which are included printed circuit boards 13 and 15. Enclosure 11 is more completely discussed in a copending application of James A. Wrabel and Casimer J. Dabrowski entitled, "Self-Locking Enclosure for Electronic Circuitry and Method of Assembling the Same," filed concurrently herewith and assigned to the same assignee as this invention. Briefly, enclosure 11 is formed of three parts which are integrally locked to form a casing for two layers of printed circuit logic boards, in which printed circuit boards 13 and 15 are on the top layer. The dual level characteristics of enclosure 11 are illustrated in FIG. 6.

Figure 2:
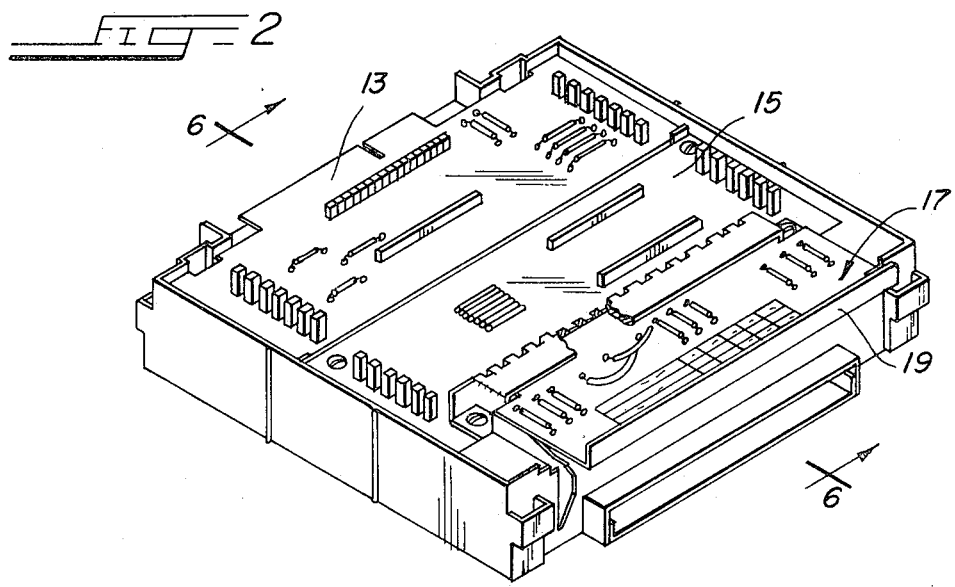
FIG. 2 is a perspective view illustrating the enclosure of FIG. 1 with the top thereof removed.

A pricing board 17 may be inserted into enclosure 11 as illustrated in FIGS. 1 and 2. Circuit board 17 has a handle 19 by which it may be grasped when it is being inserted into or withdrawn from enclosure 11. As may be seen in FIG. 1, a portion of the top of enclosure 11 is cut away to form a cut-out 20 to permit handle 19 to be grasped when the pricing board 17 is inserted into the enclosure 11.

Pricing board 17 is located over a space 21 when it is inserted into enclosure 11. A projecting portion 23 of pricing board 17 extends into a further opening 25 formed on printed circuit board 15. The sides of opening 25 are spaced to just permit the entrance of projecting portion 23 of pricing board 17 so that pricing board 17 is prevented from lateral movement.

In the opening 25 there are located various terminals 27 connected to different portions of the logic system and the vending machine. One set of these terminals is connected to receive signals indicating various credit levels established by a customer; a second set is connected to portions of the vending machine and adapted to condition the vending machine to vend a corresponding item; a third set is connected to receive signals representative of monetary units deposited by or credited to a customer; a fourth set of terminals is connected to apply input signals to a credit accumulator to cause varying amounts of credit to be accumulated; and a fifth set of terminals is connected to signals representing amounts to be debited upon vending of associated vend items.

The first set of terminals receives signals indicative of accumulated credit levels, such as from various stages of a credit accumulator. Such a credit accumulator can be of an electromechanical nature or use up-down counters, but a particularly applicable credit accumulator for utilization with this invention is that illustrated in the co-pending application of Edwin J. Meixner entitled, "Credit Accumulating Arrangement," Ser. No. 759,407, filed on Sept. 12, 1968, now Pat. No. 3,638,003, and assigned to the same assignee as this invention. A terminal is provided in the first set of terminals for each credit level at which a vend item may be vended.

In a second set of terminals, each terminal is connected to permit initiation of vending of an associated vend item when a signal appears thereon. In the particular example of a coin-operated phonograph discussed herein, these terminals would be connected to condition the phonograph for playing a single selection or an album selection when appropriate credit levels are reached. For example, a single credit level might be set at the number of credits corresponding to deposit of a dime, while the album credit level might be set at the number of credits corresponding to deposit of a quarter. These settings are achieved by appropriate interconnections on the pricing boards between terminals thereon corresponding to terminals in the first set of terminals and terminals in the second set of terminals, as discussed in more detail hereinafter.

The third set of terminals receives signals indicative of monetary units deposited or inserted in the machine. These monetary units wounld normally be in the form of coins or bills, but other credit devices such as credit cards could be utilized. Under the most common circumstances, these terminals would be supplied with signals from coin switches, and thus one terminal in this set of terminals would have a signal applied thereto when a nickel is deposited, another terminal would have a signal applied thereto when a dime is deposited, etc.

A fourth set of terminals is connected to various inputs of the credit accumulator to cause the accumulation of predetermined credits when signals appear thereon. By appropriate interconnections in the pricing board, as discussed in more detail hereinafter, signals appearing on the terminals in the third set of terminals may be conveyed to selected terminals in the fourth set of terminals to cause accumulation of an assigned credit for deposit of each monetary unit. In this fashion, the amount of credit to be accumulated for each deposited coin or bill, or to be charged against an inserted credit card, may be determined by the interconnections on the pricing board.

The terminals in the fifth set of terminals receive signals thereon indicative of the amounts to be debited against accumulated credits as a result of the completed vend. These debiting signals could be conveyed to appropriate debiting apparatus by interconnections on the pricing boards, but in the case of the particular accumulating arrangement illustrated in the above described application of Edwin J. Meixner, subtraction is achieved by complementary addition, and thus the particular embodiment described herein has the terminals in the fifth set of terminals interconnected with the terminals in the fourth set of terminals by appropriate interconnections on the pricing board.

As may be best seen in FIG. 6, when projecting portion 23 of pricing board 17 is inserted into opening 25, it is releasably detained in that position by an appropriate positioning arrangement. The positioning arrangement includes a bottom surface 29, on which are located terminals 27. Bottom surface 29 has an inclined guide surface 31 sloped upward thereto in order to direct the end of projecting portion 23 of pricing board 17 to its proper seat. A back surface 33 limits the inward motion of pricing board 17, while a downward projecting cross bar portion 35 bears against the top surface of pricing board 17 to retain the pricing board in position by a force fit.

Projecting portion 23 of pricing board 17 has terminals 37 formed on the bottom thereof. On the bottom surface 39 of printed circuit board 17 there are printed leads 41 from terminals 37 to appropriate juncture point 43. Terminals 37 are adapted to engage corresponding ones of the terminals 27 when printed circuit board 17 is releasably detained by the positioning means.

Terminals 37 could be separated into related sets of terminals and located on separate pricing board segments, but in the preferred embodiment disclosed herein all of the terminals 37 are located on a single pricing board 17.

The desired interconnections on the pricing boards may be made by means of appropriate jumpers and diodes. The diode connections for the particular pricing requirements specified in the legend are illustrated in FIG. 4. To aid in manufacturing the pricing boards, appropriate diode symbols 45 are printed on the upper surface of the pricing board 17 to enable a line worker to insert diodes at the proper place with the proper polarity. The jumper connections are illustrated at 46.

The circuit diagram of FIG. 7 illustrates in more detail the interconnections on the pricing board and the resulting functions. The terminals Q, R, S and T correspond to the first set of terminals, and the terminals O and P correspond to the second set of terminals. The terminals A and D–G correspond to the third set of terminals, and terminals J–N correspond to the fourth set of terminals, with terminals H and I corresponding to the fifth set of terminals. In addition, bonus credit terminals B and C may be considered in connection with the third set of terminals.

In this particular embodiment of the invention, provision is made for giving credit in response to the depositing of nickels, dimes, quarters, half dollars and dollar bills. In addition, bonus credit signals are provided on terminals B and C, a particular arrangement for providing such bonus signals being illustrated in the copending application of Casimer J. Dabrowski entitled, "Bonus Crediting System," U.S. patent application Ser. No. 759,270, filed on Sept. 12, 1968, now Pat. No. 3,548,-387, and assigned to the same assignee as this invention.

In the particular example illustrated in FIG. 7, two single plays or one album play will be vended for 25¢. Also, no provision is made for crediting the deposit of nickel and dimes, so that terminals F and G are not interconnected with any of the terminals J–M. Since it is desired to provide two single plays for each 25¢ of deposited credit, deposit of a quarter should result in the accumulation of two credits. Thus, terminal E is interconnected with terminal K through diode 47, so the signal appearing on terminal E from a quarter coin switch and a shaping "one-shot" is conveyed to terminal K and then to an appropriate point in the credit accumulator to cause accumulation of two credits.

In this particular example it is also desired to provide a bonus credit upon deposit of a half dollar. Therefore, terminal D is connected to terminals J and L through diodes 49 and 51, respectively, which will cause five credits to be inserted into the accumulator. If the 50¢ had been deposited in the form of two quarters, only four credits would be inserted into the accumulator. However, if the credit accumulating arrangement in the above-identified application of Casimer J. Dabrowski is utilized, a bonus signal would be produced on terminal B and conveyed to terminal J through diode 57 to cause an additional credit to be inserted into the accumulator.

Insertion of a dollar bill will cause twelve credits to be accumulated, in the particular example given here. Thus, terminal A is connected to terminals L and M through diodes 55 and 53, respectively. If the dollar were deposited in the form of one half dollar and two quarters, only nine credits would be directly inserted into the accumulator. However, if the bonus crediting arrangement illustrated and claimed in the Casimer J. Dabrowski application identified above is utilized, a bonus signal would be applied to terminal B and conveyed to terminal J through diode 57, thereby causing accumulation of ten credits.

Since the particular accumulator illustrated and claimed in the above-identified application of Edwin J. Meixner has a total maximum accumulation of thirty-one credits, subtraction by complementary addition will mean that credits in the amount of thirty-one minus the amount of credits to be debited will be inserted into the accumulator. Therefore, if a single selection is vended, the signal appearing on terminal H will be conveyed to terminals K, L, M and N through diodes 61, 63, 65 and 67 in order to cause thirty credits to be inserted into the accumulator. Similarly, if an album is played, a debit signal appearing on terminal I is conveyed to terminals J, L, M and N through diodes 69, 71, 73 and 75 to cause twenty-nine credits to be inserted into the accumulator.

Since in this example a single is to be vended for one credit and an album is to be vended for two credits, the single level of terminal P is connected to the first credit level, terminal Q. Similarly, the album level of terminal O is connected to the two credit level, terminal R.

In the particular example described in connection with FIG. 7, the interconnections have determined that a single play will be vended for one credit and that an album play will be vended for two credits; that two credits will be awarded for each quarter deposited, five credits for each fifty cents, and twelve credits for each dollar and ten credits for each dollar worth of change.

By having a series of pricing boards 17 made up with different combination of interconnections, the pricing requirements of a vending machine, such as a coin-operated phonograph, may be changed by merely pulling out one pricing board and inserting another.

It should be understood that various modifications, changes, and variations may be made in the arrangements, operations, and details of construction of the elements disclosed herein without departing from the spirit and scope of the present invention.

What is claimed is:

1. A pricing control arrangement for a vending machine comprising:
   a first set of terminals, each terminal of said first set of terminals adapted to receive a signal thereon representative of a predetermined level of credit established by a customer;
   a second set of terminals, each terminal of said second set of terminals connected to cause a signal applied thereto to condition the vending machine to vend a corresponding item;
   a third set of terminals, each terminal of said third set of terminals adapted to receive a signal thereon representative of a monetary value accredited to a customer;
   a fourth set of terminals, each terminal of said fourth set of terminals connected to cause a signal applied thereto to establish a predetermined credit;
   a pricing board having terminals thereon corresponding to said terminals of said first, second, third and fourth sets of terminals;
   positioning means adapted to releasably detain said pricing board with said terminals thereof engaging the corresponding terminals of said first, second, third and fourth sets of terminals;
   first interconnecting means on said pricing board adapted to connect at least one of said terminals in said second set of terminals with a selected one of said terminals in said first set of terminals when said pricing board is detained by said positioning means;

second interconnecting means on said pricing board adapted to connect selected ones of said terminals in said third set of terminals to selected ones of said terminals in said fourth set of terminals when said pricing board is detained by said positioning means;

a fifth set of terminals, each terminal in said fifth set of terminals adapted to receive a signal thereon representative of an amount to be debited for a vend operation;

terminals on said pricing board corresponding to said terminals of said fifth set of terminals and adapted to be engaged therewith when said pricing board is detained by said positioning means; and third interconnecting means on said pricing board adapted to connect selected ones of said terminals in said fifth set of termials to seletced ones of said terminals in said fourth set of terminals to cause the amount to be debited to be substracted by complementary addition when said pricing board is detained by said positioning means.

2. An arrangement as claimed in claim 1 and further comprising a plurality of pricing boards with said first, second and third interconnecting means connecting the associated terminals in a plurality of differing combinations, said pricing boards being selectively inserted into said positioning means to provide a desired pricing schedule.

3. An arrangement as claimed in claim 1 wherein said positioning means comprises an opening containing said terminals in said first and second sets of terminals and into which said pricing board may be inserted in a force fitting relationship.

4. An arrangement as claimed in claim 3 wherein said termnials in said first and second sets of terminals and on said pricing board are printed circuit elements.

5. A pricing control arrangement for a coin operated phonograph comprising:

a first set of terminals, each terminal of said first set of terminals adapted to receive a signal thereon representative of a predetermined level of credit established by a customer;

a second set of terminals, a first terminal of said second set of terminals connected to cause a signal applied thereto to condition the coin operated phonograph to play a single and a second terminal of said second set of terminals connected to cause a signal applied thereto to condition the coin operated phonograph to play an album;

a plurality of first pricing board segments having terminals thereon corresponding to said terminals of said first and second sets of terminals;

a third set of terminals, each terminal of said third set of terminals adapted to receive a signal thereon representative of a monetary unit deposited by a customer;

a fourth set of terminals, each terminal of said fourth set of terminals connected to cause a signal applied thereto to establish a predetermined number of credits;

a fifth set of terminals, each terminal in said fifth set of terminals adapted to receive a signal thereon representative of an amount to be debited for play of a single or album selection;

a plurality of second pricing board segments having terminals thereon corresponding to said terminals of said third, fourth and fifth sets of terminals;

positioning means adapted to releasably detain said pricing board segments with said terminals thereof engaging the corresponding terminals of said first, second, third, fourth and fifth sets of terminals;

first interconnecting means on said first pricing board segments adapted to connect at least one of said terminals in said second set of terminals with a selected one of said terminals in said first set of terminals when said first pricing board segment is detained by said positioning means;

second interconnecting means on said second pricing board segments adapted to connect selected ones of said terminals in said third set of terminals to selected ones of said terminals in said fourth set of terminals when said second pricing board segment is detained by said positioning means; and third interconnecting means on said second pricing board segments adapted to connect selected ones of said terminals in said fifth set of terminals to selected ones of said terminals in said fourth set of terminals to cause the amount to be debited to be subtracted by complementary addition when said second pricing board segment is detained by said positioning means, whereby said first and second pricing board segments may be selectively inserted into said positioning means to control the pricing of single and album selections.

6. An arrangement as claimed in claim 5 wherein said first and second pricing board segments form single pricing boards.

7. An arrangement as claimed in claim 6 wherein:

said terminals of said first, second, third, fourth and fifth sets of terminals and said first and second pricing board segments are printed circuit elements; and each of said pricing boards comprises a generally rectangular printed circuit board having an extended portion with the pricing board terminals formed on the bottom thereof located along one of the longer sides and a handle portion formed along the other of the longer sides.

8. An arrangement as claimed in claim 7 wherein said positioning means comprises:

an opening just wide enough to receive said pricing boards;

a bottom surface in said opening bearing said terminals of said first, second, third, fourth and fifth sets of terminals;

an upwardly inclined guide portion leading to said bottom surface; and a downwardly projecting upper cross bar bearing against the upper surface of said pricing boards to force said pricing boards against said bottom surface, whereby said terminals on said pricing boards are firmly forced against the corresponding terminals in said first, second, third, fourth and fifth sets of terminals.

References Cited

UNITED STATES PATENTS

| | | | |
|---|---|---|---|
| 3,223,216 | 12/1965 | Rub | 194—1 N |
| 3,042,173 | 7/1962 | Thomas et al. | 194—15 |
| 3,420,987 | 1/1969 | Houle | 194—1 N |
| 3,357,531 | 12/1967 | Romanowski | 194—1 N |

SAMUEL F. COLEMAN, Primary Examiner

F. J. BARTUSKA, Assistant Examiner

U.S. Cl. X.R.

194—15